(12) United States Patent
Simon

(10) Patent No.: US 6,825,299 B2
(45) Date of Patent: Nov. 30, 2004

(54) PROCESS FOR CONTROLLED RADICAL POLYMERIZATION IN AQUEOUS DISPERSION

(75) Inventor: Dirk Simon, Mutterstadt (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/381,226

(22) PCT Filed: Sep. 18, 2001

(86) PCT No.: PCT/EP01/10781

§ 371 (c)(1),
(2), (4) Date: Mar. 21, 2003

(87) PCT Pub. No.: WO02/24761

PCT Pub. Date: Mar. 28, 2002

(65) Prior Publication Data

US 2004/0019164 A1 Jan. 29, 2004

(30) Foreign Application Priority Data

Sep. 25, 2000 (EP) ............................................. 00810881

(51) Int. Cl.⁷ ................................................. C08F 2/18
(52) U.S. Cl. ........................ 526/217; 526/348; 524/878
(58) Field of Search ................................ 526/217, 348; 524/878

(56) References Cited

U.S. PATENT DOCUMENTS

| 4,581,429 | A | 4/1986 | Solomon et al. | 526/220 |
|---|---|---|---|---|
| 6,353,065 | B1 | 3/2002 | Charleux et al. | 526/220 |
| 6,353,107 | B1 | 3/2002 | Kramer et al. | 546/216 |
| 6,479,608 | B1 | 11/2002 | Nesvadba et al. | 526/328.5 |
| 6,518,326 | B1 | 2/2003 | Nesvadba et al. | 522/12 |
| 6,569,940 | B1 | 5/2003 | Wunderlich et al. | 524/718 |
| 2002/0061988 | A1 * | 5/2002 | Klaerner et al. | 526/193 |

FOREIGN PATENT DOCUMENTS

| DE | 19727502 | | 1/1999 | |
|---|---|---|---|---|
| DE | 19727505 | | 1/1999 | |
| GB | 2335190 | | 9/1999 | |
| GB | 2335190 | A * | 9/1999 | ........... C07D/00/00 |
| WO | 99/00426 | | 1/1999 | |
| WO | 99/11674 | | 3/1999 | |

OTHER PUBLICATIONS

English language abstract for DE 19727505 (1999).

English language abstract for DE 19727502 (1999).

W. Meylan et al., Journal of Pharmaceutical Sciences, vol. 84, No. 1, Jan. 1995, pp. 83–92.

* cited by examiner

Primary Examiner—William K. Cheung
(74) Attorney, Agent, or Firm—Tyler A. Stevenson

(57) ABSTRACT

The present invention relates to a process for controlled radicalpolymerization in aqueous dispersion in the presence of selected nitroxyl radicals having a defined partition equilibrium between water and monomer as measured by their log p. wherein p is the partition coefficient of the nitroxyl radical in octanol and water.

11 Claims, No Drawings

PROCESS FOR CONTROLLED RADICAL POLYMERIZATION IN AQUEOUS DISPERSION

The present invention relates to a process for controlled radical polymerization in aqueous dispersion in the presence of selected nitroxyl radicals having a defined partition equilibrium between water and monomer as measured by their log p, wherein p is the partition coefficient of the nitroxyl radical in octanol and water.

Polymerization processes using water as a continuous dispersing phase wherein initially the monomers and after polymerization the polymers are dispersed are widely used for manufacturing polymers (aqueous dispersion polymerization). Mostly, water and a water-insoluble monomer, an emulgator and/or a protective colloid and a suitable initiator system are mixed by generally known methods building a monomer swollen micellar system or stabilized monomer droplets.

Of particular interest are emulsion polymerizations, wherein usually water soluble initiator systems are used.

The monomers are essentially insoluble in the aqueous phase and form finely distributed droplets therein. The addition of dispersing agents such as for example sodium dodecyl-sulfate is in many cases necessary to achieve such stable droplets and micelles. Examples of dispersing agents are for example given in "Ullmann Enzyklopädie der technischen Chemie, Bd.10, 4. Auflage, Verlag Chemie, Weinheim (1975), page 449".

Several variations are known in the state of the art, for example emulgator free emulsion polymerization, mini emulsion polymerization and micro emulsion polymerization. These variations are characterized by changes of kind and amount of the emulgator and initiator systems leading to different polymer products especially with regard to molecular weight, polymer particle size and their distributions.

Polymers or copolymers prepared by free radical polymerization processes inherently have broad molecular weight distributions or polydispersities which are generally higher than about four. One reason for this is that most of the free radical initiators have half lives that are relatively long, ranging from several minutes to many hours, and thus the polymeric chains are not all initiated at the same time and the initiators provide growing chains of various lengths at any time during the polymerization process. Another reason is that the propagating chains in a free radical process can react with each other in processes known as combination and disproportionation, both of which are irreversibly chain-terminating reaction processes. In doing so, chains of varying lengths are terminated at different times during the reaction process, resulting in resins consisting of polymeric chains which vary widely in length from very small to very large and which thus have broad polydispersities. If a free radical polymerization process is to be used for producing narrow molecular weight distributions, then all polymer chains must be initiated at about the same time and termination of the growing polymer-chains by combination or disproportionation processes must be avoided.

A method to reduce polydispersity and to avoid the disadvantages of conventional radical polymerization has already been described by Solomon et al., U.S. Pat. No. 4,581,429, issued Apr. 8, 1986, wherein a free radical polymerization process is disclosed which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3 tetraethylisoindoline, 1,1,3,3 tetrapropylisoindoline, 2,2,6,6 tetramethylpiperidine, 2,2,5,5 tetramethylpyrrolidine or di-t-butylamine.

In WO 99/00426 emulsion polymerization of ethylenically unsaturated monomers in the presence of nitroxyl radicals has been described in greater detail, pointing out that the monomer droplets have a size of less or equal 500 nm.

Recently in EP 970973 emulsion polymerization in the presence of a stable free radical has been described, pointing out that the water solubility of the stable free radical is at least 0.1 g/l at 25° C. Additionally, in WO 99/11674 the requirement of the molale solubility of the nitroxyl radicals in the aqueous medium is described as being at least $10^{-6}$ mol/kg and most preferred at least $10^{-1}$ mol/kg at 25° C. and 1 bar.

In the instant invention it has been found, that the most important property of the nitroxyl radicals is not the good solubility in water but the partition equilibrium between water and monomer as reflected by the log p value of the nitroxyl. The right balance between solubility in water and solubility in the monomer droplets influences strongly the efficiency in terms of polydispersity, rate of polymerization and yield.

The partition coefficient log p (octanol/water) is a widely used parameter for example in rating the environmental impact of chemical compounds. Its calculation is described by W. M. Meylan, P. H. Howard in J. Pharmaceutical Sciences 84, (1995), 83–92.

One subject of the instant invention is a process for preparing an oligomer, a cooligomer, a polymer or a copolymer (block or random) by free radical polymerization in aqueous dispersion of at least one ethylenically unsaturated monomer or oligomer, which comprises forming an aqueous dispersion, having the monomer in the disperse phase and (co)polymerizing the monomer or monomers/oligomers at elevated temperature in the presence of a) at least one stable free nitroxyl radical which has a log p (octanol/water) of between −0.5 and 7.5 and which is selected from the group consisting of a compound of formula (A), (B), (C), (D), (E), (F), (G), (H) or (I)

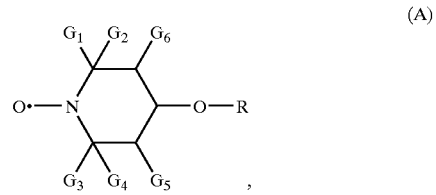

(A)

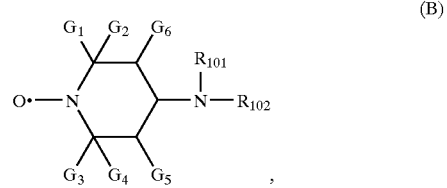

(B)

-continued (C) 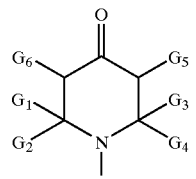

(D) 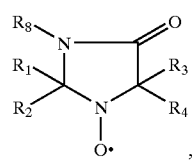

(E) 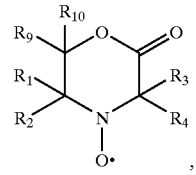

(F) 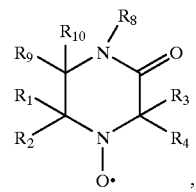

(G) 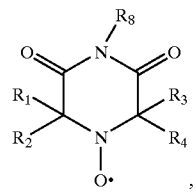

(H) 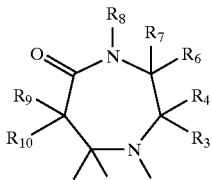

(I) 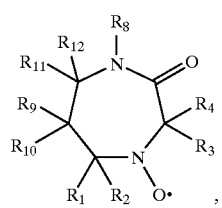

wherein

R is hydrogen, $C_1$–$C_{18}$alkyl which is uninterrupted or interrupted by one or more oxygen atoms, cyanoethyl, benzoyl, glycidyl, a monovalent radical of an aliphatic carboxylic-acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$–$C_4$alkyl, and
$G_1$ and $G_3$ are methyl and $G_2$ and $G_4$ are ethyl or propyl or $G_1$ and $G_2$ are methyl and $G_3$ and $G_4$ are ethyl or propyl;

$R_1$, $R_2$, $R_3$ and $R_4$ independently of each other are $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;

$R_5$, $R_6$ and $R_7$ independently are hydrogen, $C_1$–$C_{18}$alkyl or $C_6$–$C_{10}$aryl;

$R_8$ is hydrogen, OH, $C_1$–$C_{18}$alkyl, $C_3$–$C_{18}$alkenyl, $C_3$–$C_{18}$alkinyl;

$C_1$–$C_{18}$alkyl, $C_3$–$C_{18}$alkenyl, $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl; and $R_9$, $R_{10}$, $R_{11}$ and $R_{12}$ are independently hydrogen, phenyl or $C_1$–$C_{18}$alkyl; and b) a free radical initiator.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4pentadienyl, 3-methyl-2-butenyl, n-2-octenyl, n-2-dodecenyl, iso-dodecenyl, oleyl, n-2-octadecenyl oder n4-octadecenyl. Preferred is alkenyl with 3 bis 12, particularly preferred with 3 to 6 carbon atoms.

Alkinyl with 3 to 18 is a linear or branched radical as for example propinyl (—$CH_2$—C≡CH), 2-butinyl, 3butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$–$C_{18}$alkyl interrupted by at least one O atom is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—$CH_2$—$CH_3$, —$CH_2$—. It is preferably derived from polyethylene glycol. A general description is —$((CH_2)_a$—O$)_b$—H/$CH_3$, wherein a is a number from 1 to 6 and b is a number from 2 to 10.

$C_2$–$C_{18}$alkyl interrupted by at least one $NR_5$ group may be generally described as —$((CH_2)_a$—$NR_5)_b$—H/$CH_3$, wherein a, b and $R_5$ are as defined above.

$C_3$–$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$–$C_{10}$ aryl is for example phenyl or naphthyl, but also comprised are $C_1$–$C_4$alkyl substituted phenyl, $C_1$–$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$–$C_9$phenylalkyl is benzyl, phenylethyl or phenylpropyl.

$C_5$–$C_{10}$heteroaryl is for example pyrrol, pyrazol, imidazol, 2,4,dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butylhydroxyphenyl)propionyl radical.

$C_1$–$C_{18}$alkanoyl is for example, formyl, propionyl, butyryl, octanoyl, dodecanoyl but preferably acetyl and $C_3$–$C_5$alkenoyl is in particular acryloyl.

The above compounds and their preparation are described in GB 2335190 and in GB 2342649.

Preferred is a process, wherein in formula A, B and C

R is hydrogen, $C_1$–$C_{18}$alkyl, cyanoethyl, benzoyl, glycidyl, a monovalent radical of an aliphatic, carboxylic acid;

$R_{101}$, is $C_1$–$C_{12}$alkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, glycidyl, a group of the formula —$CH_2CH(OH)$-Z or of the formula —CO-Z, wherein Z is hydrogen, methyl or phenyl.

Another preferred process is, wherein in formula (D), (E), (F), (G), (H) and (I) at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$–$C_6$cycloalkyl radical and one remaining substituents is ethyl, propyl or butyl.

Specific particularly suitable compounds are given in the following Table.

| Compound No. | Nitroxyl-Radical | log p |
|---|---|---|
| 101 | | 2.6 |
| 102 | | 3.0 |
| 103 | | 2.2 |
| 104 | | 7.4 |

-continued
| Compound No. | Nitroxyl-Radical | log p |
|---|---|---|
| 105 | 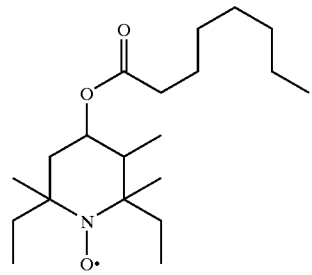 | 5.9 |
| 106 | 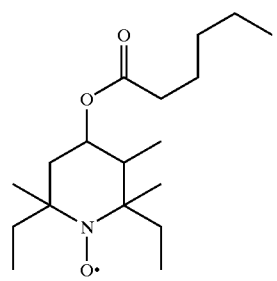 | 4.9 |
| 107 | 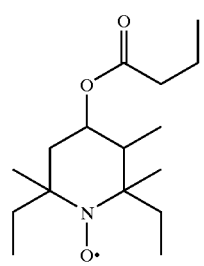 | 4.0 |
| 108 | 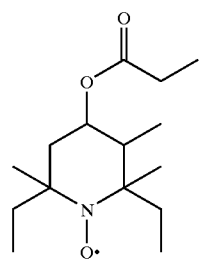 | 3.5 |
| 109 | 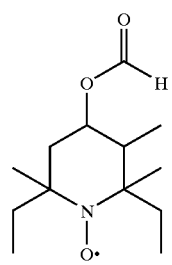 | 2.4 |

| Compound No. | Nitroxyl-Radical | log p |
|---|---|---|
| 110 | 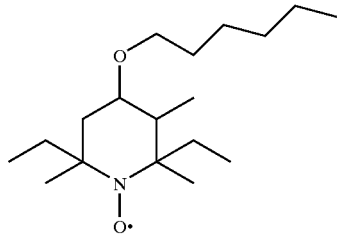 | 5.1 |
| 111 | 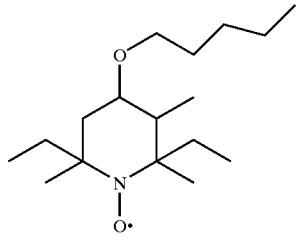 | 4.6 |
| 112 | 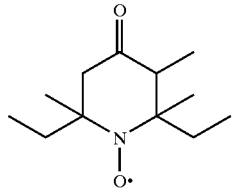 | 1.5 |
| 113 | 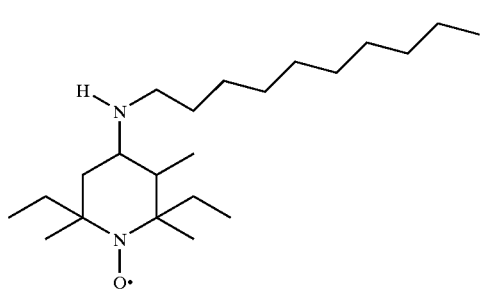 | 6.8 |
| 114 | 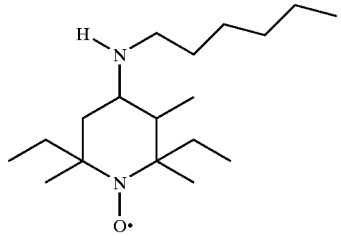 | 4.9 |
| 115 | 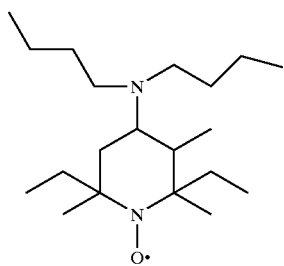 | 5.6 |

-continued

| Compound No. | Nitroxyl-Radical | log p |
|---|---|---|
| 116 | | 4.6 |
| 117 | | 2.0 |
| 118 | | 6.8 |
| 119 | | 5.8 |
| 120 | | 4.9 |
| 121 | | 3.9 |

-continued

| Compound No. | Nitroxyl-Radical | log p |
|---|---|---|
| 122 | | 1.9 |
| 123 | | 3.6 |
| 124 | | 3.1 |

Preferably log p is from 0 to 5 and more preferably from 1 to 5.

Preferably the free radical initiator of component b) is a bis-azo compound, a peroxide or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl pemeodecanoate, t-butyl pemeodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5dibenzoate, t-butyl peracetate, t-amyl perbenzoate, t-butyl perbenzoate, 2,2-bis(t-butylperoxy) butane, 2,2 bis (t-butylperoxy) propane, dicumyl peroxide, 2,5dimethylhexane-2,5-di-t-butylperoxide, 3-t-butylperoxy 3-phenylphthalide, di-t-amyl peroxide, α,α'-bis(t-butylperoxy isopropyl) benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

The radical initiator has preferably a water solubility of at least 1 g/l at 20° C.

Most preferred are the following compounds, which are all commercially available.

WAKO VA-061 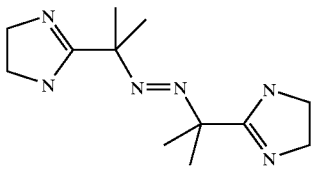

WAKO V-501 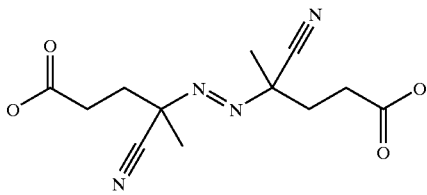

WAKO V-30 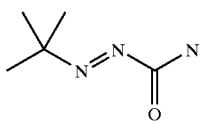

WAKO VA-086 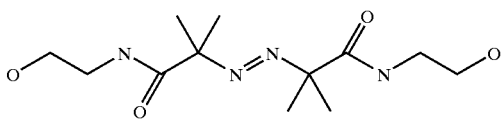

WAKO VA-044 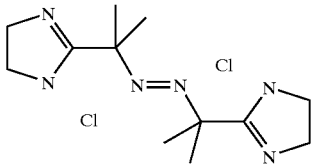

WAKO V-50 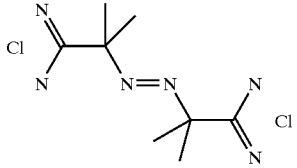

Natrium-peroxodisulfat
Kalium-peroxodisulfat
Ammonium-peroxodisulfat

It is also possible to use combinations of Fe-compounds or Co-compounds with peroxo salts or salts of bisulfites or hydrosulfites. These combinations are known as redox systems.

Preferably the ethylenically unsaturated monomer is selected from the group consisting of styrene, substituted styrene, conjugated dienes, acrolein, vinyl acetate, vinylpyrrolidone, vinylimidazole, maleic anhydride, (alkyl) acrylic acidanhydrides, (alkyl)acrylic esters, (meth) acrylonitriles, (alkyl)acrylamides.

More preferred the ethylenically unsaturated monomer is an acrylic acid ester, acrylamide, acryinitrile, methacrylic acid ester, methacrylamide, methacrylnitrile.

A preferred ethylenically unsaturated monomer conforms to formula $CH_2=C(R_a)-(C=Z)-R_b$, wherein $R_a$ is hydrogen or $C_1-C_4$alkyl, $R_b$ is $NH_2$, glycidyl, unsubstituted $C_1-C_{18}$alkoxy, $C_2-C_{100}$alkoxy interrupted by at least one N and/or O atom, or hydroxy-substituted $C_1-C_{18}$alkoxy, unsubstituted $C_1-C_{18}$alkylamino, di($C_1-C_{18}$alkyl)amino, hydroxy-substituted $C_1-C_{18}$alkylamino or hydroxy-substituted di($C_1-C_{18}$alkyl)amino or $-O-CH_2-CH_2-N(CH_3)_2$;

Z is oxygen or sulfur.

Examples for $R_b$ as $C_2-C_{100}$alkoxy interrupted by at least one O atom are of formula

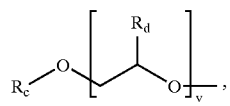

wherein $R_c$ is $C_1-C_{25}$alkyl, phenyl or phenyl substituted by $C_1-C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

Further acrylate monomers are

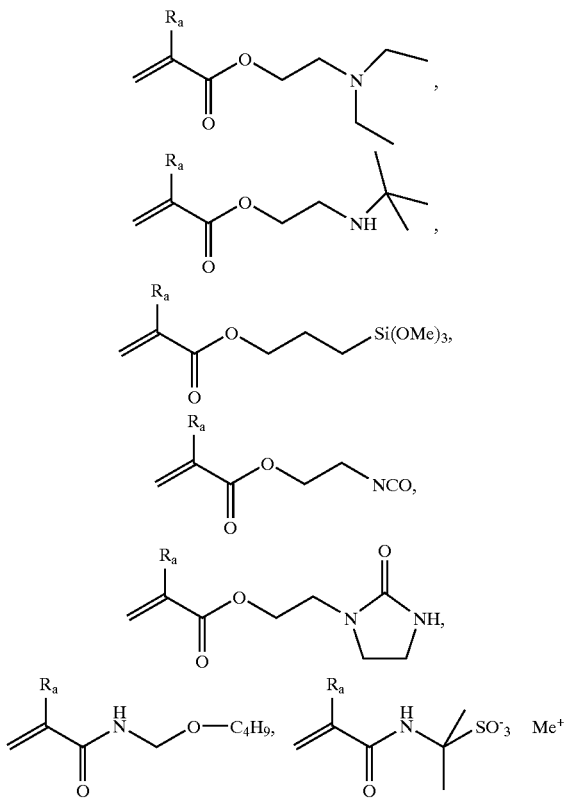

Examples for suitable monomers other than acrylates are

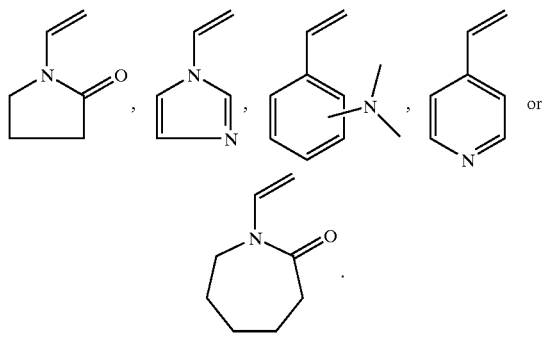

Preferably $R_a$ is hydrogen or methyl, $R_b$ is $NH_2$, gycidyl, unsubstituted or with hydroxy substituted $C_1$–$C_4$alkoxy, unsubstituted $C_1$–$C_4$alkylamino, di($C_1$–$C_4$alkyl)amino, hydroxy-substituted $C_1$–$C_4$alkylamino or hydroxy-substituted di($C_1$–$C_4$alkyl)amino; and Z is oxygen.

Preferably the aqueous phase is from 25 to 95% more preferably from 40 to 80% and most preferred from 45 to 75% by weight, based on the total mixture.

The total mixture contains water, at least one monomer, the above mentioned regulator and initiator and in many cases at least one surfactant and/or a organic solvent.

Optionally other water miscible solvents may be present usually less than 10% by weight based on the water content. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof.

Preferred are water, water alcohol mixtures, water ethylene glycol or propylene glycol mixtures, water acetone, water tetrahydrofurane, or water dimethylformamide mixtures.

Preferably the solids content of the resulting polymer dispersion is between 15–60% by weight.

Preferably the nitroxyl radical of component a) is present in an amount of from 0.001 mol-% to 20 mol-%, based on the monomer or monomer mixture.

In case of monomer mixtures an average molecular weight is calculated.

Preferably the free radical initiator is present in an amount of from 0.01 mol-% to 20 mol-%, more preferably from 0.1 mol-% to 10 mol-% and most preferably from 0.2 mol-% to 5 mol-%, based on the monomer or monomer mixture.

Preferably the molar ratio of free radical initiator to stable free nitroxyl radical is from 20:1 to 1:2, more preferably from 10:1 to 1:2.

The temperature for polymerization is preferably from 60° C. to 180° C., more preferably from 80° C. to 140° C. and most preferably from 80° C. to 110° C.

The pressure during the reaction depends on the temperature applied and is preferably between 0.1 bar and 20 bar, more preferably between 1 and 10 bar.

The reaction mixture may also contain a buffer to adjust and maintain the pH value, preferably between 4.5 and 9. Phosphate or citric acid buffers are preferred.

The process is particularly useful for the preparation of block copolymers.

Block copolymers are, for example, block copolymers of polystyrene and polyacrylate (e.g., poly(styrene-co-acrylate) or poly(styrene-co-acrylate-co-styrene). They are usefull as adhesives or as compatibilizers for polymer blends or as polymer toughening agents. Poly(methylmethacrylate-co-acrylate) diblock copolymers or poly(methylacrylate-co-acrylate-co-methacrylate) triblock copolymers) are useful as dispersing agents for coating systeme, as coating additives (e.g. theological agents, compatibilizers, reactive diluents) or as resin component in coatings (e.g. high solid paints) Block copolymers of styrene, (meth)acrylates and/or acrylonitrile are useful for plastics, elastomers and adhesives.

Furthermore, block copolymers of this invention, wherein the blocks alternate between polar monomers and non-polar monomers, are useful in many applications as amphiphilic surfactants or dispersants for preparing highly uniform polymer blends.

Particularly, emulsion polymerization is especially suitable to build-up polymer particles with specific morphology. For example, core/shell structures can be achieved by consecutively changing monomers during polymerization. These special particles are useful for improving impact resistance of plastics. Oftenly, these core/shell structures are polymer blends of at least two types of polymers which are formed within the polymer particle during emulsion polymerization. By applying controlled free radical polymerization during consecutive monomer feed, block copolymers are formed which improve the compatibilizing effect of the different polymers within the polymer particle. Furthermore, core/shell structures can be synthesized by grafting a different monomer during emulsion polymerization on polymer particles containing unsaturations, e.g. butadiene (co-)polymers. Applying controlled free radical polymerization within this grafting process, graft polymers with uniform graft arm lengths and even new graft polymers are accessible.

Consequently the formation of block and graft polymers is a subject of the present invention.

The (co)polymers of the present invention may have a number average molecular weight from 1 000 to 400 000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

The polymers or copolymers of the present invention have preferably a polydispersity of from 1.1 to 2, more preferably of from 1.2 to 1.8.

The average particle diameter of the dispersed polymer particles is preferably from 25 nm to 1000 nm, more preferably 200 nm to 700 nm. Particle size may for example be measured by a high speed centrifuge or by photon correlation spectroscopy.

The particle size distribution may be monomodal or bimodal.

The process of emulsion polymerization per se is known and for example described in WO 99/00426 or in WO00/50480. It may be carried out as a batch process or in a continuous or semi continuous process.

The initiator and/or regulator may for example be added at the beginning of the reaction, however it is also possible to add one or the other in portions or continuously at the beginning and during the reaction.

Suitable surfactants or surface active compounds which may be added are known in the art. The amounts typically used range from 0.01% by weight to 10% by weight, based on the monomer or monomers.

Suitable surface active compounds are protective colloids such as polyvinylalcohols, starch, cellulose derivatives or copolymers containing vinylpyrrolidone. Further examples are given in "Houben-Weyl, Methoden der Organischen Chemie, Band XIV/1, Makromolekulare Stoffe, G. Thieme Verlag Stuttgart 1961, 411–420".

Typical surfactants useful in the present invention are of nonionic, cationic or anionic type.

Examples for anionic surfactants are alkali and ammonium salts of $C_{12}$–$C_{18}$alkylsulfonic acid, dialkyl esters of succinic acid or sulfuric acid halfesters of ethoxylated alkanoles. These compounds are known for example from U.S. Pat. No. 4,269,749 and largely items of commerce, such as under the trade name Dowfax® 2A1 (Dow Chemical Company).

Nonionic surfactants are for example aliphatic or araliphatic compounds such as ethoxylated phenols (mon, di, tri) with an ethoxylation degree of 3 to 50 and alkyl groups in the range from $C_4$–$C_9$, ethoxylated long chain alcohols or polyethyleneoxide/polypropyleneoxide block copolymers.

The emulsion polymerization may be carried out as seed free process or according to a seed-latex process which seed latex may also be prepared in situ. Such processes are known and for example described in EP-A-614 922 or in EP-A-567 812.

The present invention also encompasses in the synthesis novel block, multi-block, star, gradient, random, hyperbranched and dendritic copolymers, as well as graft copolymers.

The polymers prepared by the present invention are useful for following applications:

adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Because the present polymerizaton is a "living" polymerization, it can be started and stopped practically at will. Furthermore, the polymer product retains the functional alkoxyamine group allowing a continuation of the polymerization in a living matter. Thus, in one embodiment of this invention, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)-acrylate block is prepared first, then a styrene or butadiene block is attached thereto, and so on.

The following examples illustrate the invention.

General

Polymers are characterized by gel-permeation-chromatography (GPC), with a Hewlett Packard HP 1090 LC, column PSS 1, length 60 cm, elution with tetrahydrofurane (THF), rate 1 ml/min, concentration 10 mg polymer in 1 ml THF, Calibration with styrene. Polydispersity is calculated from Mn (g/mol) and Mw (in g/mol) as PD=Mw/Mn.

Log p is calculated using the following program:

LOGKOWNT program (Windows NT console application)

Syracuse Research Corporation

6225 Running Ridge Road

North Syracuse

N.Y. 13212

Nitroxyls

Nitroxyls are prepared according to GB 2335190 and GB 2342649.

Initiators

Initiators used are commercial products of Aldrich and WAKO Chemicals.

Emulsion Polymerization

Examples 1–10 are carried out using 40 g styrene, 320 g water and 1.8 g sodium dodecylsulfate. The mixture is degassed with argon.

For examples 1–10 the initiator is either 0.3322 g WAKO VA086 (commercial azo-initiator) or 0.3115 g potassium peroxodisulfate (KPS), both dissolved in additional 20 g water and degassed with argon.

The nitroxyl radicals are added as indicated in Table 1 either dissolved in additional 20 g water or in additional 20 g styrene degassed with argon.

Polymerization at 100° C.

Polymerization at 100° C. is carried out in a three neck flask with reflux condenser, dropping funnel with nitrogen balloon and stirrer.

The regulator solution and the styrene water mixture are filled into the three neck flask under nitrogen atmosphere under stirring with 320 rounds per minute. The mixture is heated to 100° C. in 45 minutes and the initiator solution is dropwise added within 2 minutes. The reaction mixture is kept at 100° C. for 23 hours and stirred with 320 rounds per minute. After cooling down the reaction mixture and drying the residue under vacuum the yield is determined gravimetrically. Polymer characterization is carried out from a solution of the polymer in tetrahydrofurane.

Polymerization at 120° C.

Polymerization at 120° C. is carried out in a double wall three neck flask with reflux condenser, pressuring and vacuum unit and stirrer.

Polymerization is carried out as described above with the following differences: stirring speed: 600 rounds per minute; nitrogen pressure: 5 bar, temperature: 120° C.; and reaction time 9 hours.

The polymerization runs are given in Table 1.

TABLE 1

| No. | Initiator | Nitroxyl-Radical | Amount Nitroxyl [g] | log p | Temperature/Time [° C./h] |
|---|---|---|---|---|---|
| B1 | KPS | 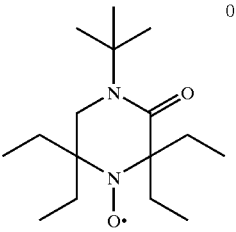 dissolved in styrene | 0.6859 | 2.6 | 100/23 |
| B2 | KPS | 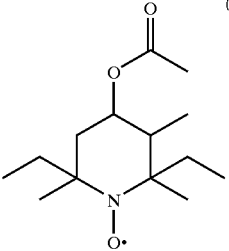 dissolved in Styrene | 0.6226 | 3.0 | 100/23 |
| B3 | KPS | 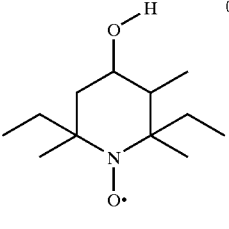 | 0.9607 | 2.2 | 100/23 |
| B4 | VA086 | 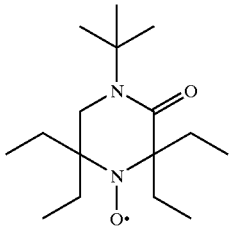 dissolved in water | 0.9274 | 2.6 | 120/9 |
| B5 | VA086 | 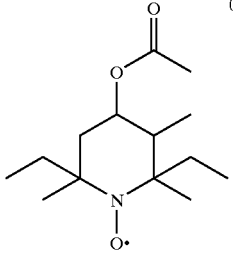 dissolved in styrene | 0.6234 | 3.0 | 120/9 |
| B6 | VA086 | 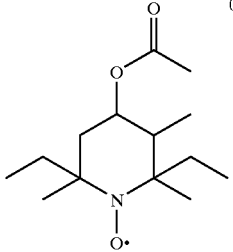 dissolved in styrene | 0.5932 | 3.0 | 120/9 |
| B7 | VA086 | 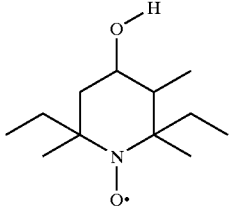 dissolved in water | 0.5187 | 2.2 | 120/9 |
| B8 | VA086 | 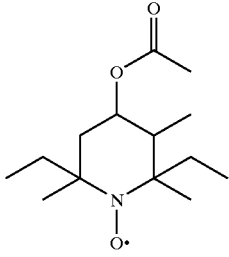 dissolved in styrene | 0.2963 | 3.0 | 100/23 |

TABLE 1-continued

| No. | Initiator | Nitroxyl-Radical | Amount Nitroxyl [g] | log p | Temperature/Time [° C./h] |
|---|---|---|---|---|---|
| B9 | KPS | 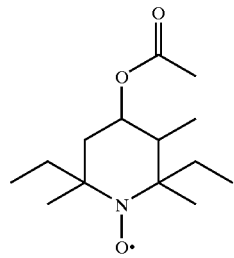 dissolved in styrene | 0.3078 | 3.0 | 100/23 |
| B10 | VA086 | 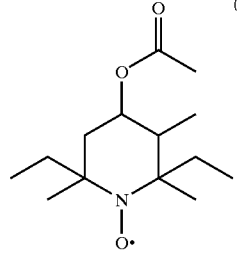 dissolved in styrene | 0.2278 | 3.0 | 100/23 |

The results are given in Table 2.

TABLE 2

| No. | Mn [g/mol] | Mw [g/mol] | PD | Yield [1%] |
|---|---|---|---|---|
| B1 | 8.800 | 9.700 | 1.1 | 48 |
| B2 | 10.800 | 13.000 | 1.2 | 64 |
| B3 | 23.200 | 27.300 | 1.2 | 80 |
| B4 | 3.700 | 4.500 | 1.2 | 21 |

TABLE 2-continued

| No. | Mn [g/mol] | Mw [g/mol] | PD | Yield [1%] |
|---|---|---|---|---|
| B5 | 7.500 | 9.100 | 1.2 | 32 |
| B6 | 6.300 | 7.700 | 1.2 | 22 |
| B7 | 19.000 | 25.000 | 1.3 | 57 |
| B8 | 18.000 | 22.100 | 1.2 | 34 |
| B9 | 15.000 | 17.700 | 1.2 | 62 |
| B10 | 33.000 | 41.400 | 1.3 | 44 |

EXAMPLES B11 AND B12

Variation of Initiators

The emulsion polymerizations are performed as described in the general procedure but by varying the type and amount of initiators. Furthermore, the amount of nitroxyl compound No. 102 is varied. The examples are summarized in Table 3.

TABLE 3

| No. | Type of Initiator | Amount of Initiator [g] | Amount Nitroxyl Compound No. 102 [g] |
|---|---|---|---|
| B11 | WAKO V-50 | 0.3151 | 0.2965 |
| B12 | tert-BuOOH | 0.1176 | 0.4141 |

All polymerizations are carried out at 100° C. for 23 h. The results are presented in Table 4.

TABLE 4

| No. | Mn [g/mol] | Mw [g/mol] | PD | Yield [%] |
|---|---|---|---|---|
| B11 | 14200 | 16000 | 1.1 | 30 |
| B12 | 1.500 | 1.700 | 1.1 | 5 |

Comparative polymerization runs are given in Table 5 and 6.

TABLE 5

| No. | Initiator | Nitroxyl-Radical | Amount Nitroxyl [g] | log p | Temperature/Time [° C./h] |
|---|---|---|---|---|---|
| V1 | VA086 | — | — | — | 100/23 |
| V2 | KPS | — | — | — | 85/23 |
| V3 | VA086 | 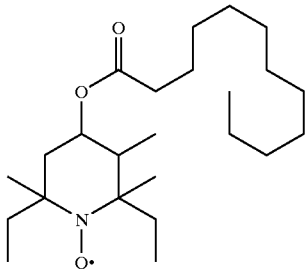 dissolved in styrene | 0.9620 | 7.9 | 120/9 |

TABLE 5-continued

| No. | Initiator | Nitroxyl-Radical | Amount Nitroxyl [g] | log p | Temperature/Time [° C./h] |
|---|---|---|---|---|---|
| V4 | VA086 | 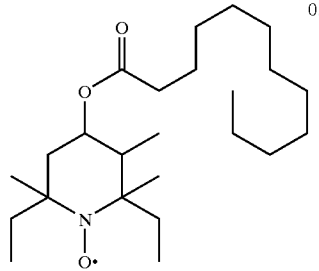<br>dissolved in styrene | 0.9594 | 7.9 | 100/23 |
| V5 | KPS | 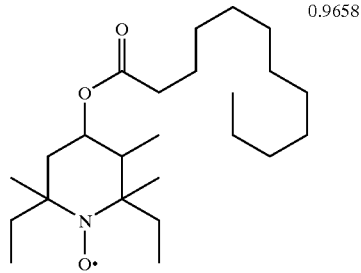<br>dissolved in styrene | 0.9658 | 7.9 | 100/23 |

The results of the comparative examples are presented in Table 6.

TABLE 6

| No. | Mn [g/mol] | Mw [g/mol] | PD | Yield [%] |
|---|---|---|---|---|
| V1 | 253.000 | 943.000 | 3.7 | 100 |
| V2 | 95.000 | 397.000 | 4.2 | 100 |
| V3 | 7.000 | 158.000 | 23 | 13 |
| V4 | 383.000 | 1,046.000 | 2.7 | 77 |
| V5 | 49.000 | 538.000 | 11 | 85 |

From the comparative experiments it becomes apparent that PD exceeds 2 significantly, indicating that essentially no control of the polymerization exists.

EXAMPLE B13

Emulsion Polymerization of n-butylacrylate

Following formulation is emulsion polymerized at 100° C. for 23 h as described in the general procedure:

60 g n-butylacrylate 344 g water 1.8 g sodium dodecylsulfate 0.2537 g potassium peroxodisulfate (KPS)

0.5099 g of compound No. 102

| Yield: 6% | |
|---|---|
| GPC-results: | Mn: 820 g/mol |
| | Mw: 930 g/mol |
| | PD: 1.1 |

EXAMPLE B14

Emulsion Co-Polymerization of n-butylacrylate and Zonyl® TA-M

Following formulation is emulsion polymerized at 120° C. for 9 h as described in the general procedure:

40 g n-butylacrylate 20 g Zonyl TA-M (commercial available fluoro acrylate composition; CAS RN 132324-93-7)

340 g water 1.8 g sodium dodecylsulfate 0.1080 g VA086

0.1587 g of compound No. 103

| Yield: 34% | |
|---|---|
| GPC-results: | Mn: 15.200 g/mol |
| | Mw: 17.500 g/mol |
| | PD: 1.2 |

EXAMPLE B15

Emulsion Co-Polymerization of Styrene and Acrylonitrile

Following formulation is emulsion polymerized at 100° C. for 23 h as described in the general procedure:

60 g styrene 20 g acrylonitril 320 g water 1.8 g sodium dodecylsulfate 0.5169 g potassium peroxodisulfate (KPS)
0.6413 g of compound No. 102
Acrylonitril is added 30 min. after addition of the initiator.

| | | |
|---|---|---|
| Yield: 52% | | |
| GPC-results: | Mn: | 17.300 g/mol |
| | Mw: | 24.500 g/mol |
| | PD: | 1.4 |

EXAMPLE B16

Re-Initiation of PS-Macroinitiator with Styrene 2.5 g of the product of example B5 are dissolved in 25 ml styrene. The solution is purged with Argon and heated for 24 h at 130° C. The product is precipitated in methanol and dried.

| | | |
|---|---|---|
| Yield: 90% | | |
| GPC-results: | Mn: | 47.200 g/mol |
| | Mw: | 60.000 g/mol |
| | PD: | 1.3 |

EXAMPLE B17

Synthesis of Polystyrene-Block-n-Butylacrylate:

5 g of the product of example 85 are dissolved in 25 g n-butylacrylate. The solution is purged with Argon and heated for 24 h at 145° C. The product is precipitated in methanol and dried.

| | | |
|---|---|---|
| Yield: 14% | | |
| GPC-results: | Mn: | 13.000 g/mol |
| | Mw: | 16.500 g/mol |
| | PD: | 1.3 |

EXAMPLE B18

Re-Initiation of PS-Macroinitiator with Styrene 5 g of the product of example B9 are dissolved in 50 ml styrene. The solution is purged with Argon and heated for 24 h at 130° C. The product is precipitated in methanol and dried.

| | | |
|---|---|---|
| Yield: 77% | | |
| GPC-results: | Mn: | 69.000 g/mol |
| | Mw: | 99.400 g/mol |
| | PD: | 1.4 |

EXAMPLE B19

Synthesis of Polystyrene-Block-n-butylacrylate 5 g of the product of example B9 are dissolved in 25 g n-butylacrylate. The solution is purged with Argon and heated for 24 h at 145° C. The product is precipitated in methanol and dried.

| | | |
|---|---|---|
| Yield: 38% | | |
| GPC-results: | Mn: | 24,500 g/mol |
| | Mw: | 34,600 g/mol |
| | PD: | 1, 4 |

EXAMPLE B20

Synthesis of Polystyrene-Block-n-butylacrylate in Emulsion (One Pot)

Following formulation is emulsion polymerized at 100° C. for 36 h as described in the general procedure:

60 g styrene 340 g water 1.8 g sodium dodecylsulfate 0.3122 g potassium peroxodisulfate (KPS)

0.6211 g of compound No. 102

After 36 h, a sample is taken and the molecular weight distribution is characterized:

| | | |
|---|---|---|
| GPC-results: | Mn: | 17.900 g/mol |
| | Mw: | 23.600 g/mol |
| | PD: | 1, 3 |

After adding 60 g n-butylacrylate drop wise within 15 min, the emulsion polymerization is continued for additional 60 hours at 100° C. The product is worked-up according to the general procedure described before.

| | | |
|---|---|---|
| Overall conversion: 63% | | |
| GPC-results: | Mn: | 25.000 g/mol |
| | Mw: | 32,400 g/mol |
| | PD: | 1, 3 |

The block copolymer is analyzed by $^1$H-NMR (CDCl$_3$-solution), which revealed following co-monomer composition:

| | |
|---|---|
| First block: | 100 mol % styrene |
| Second block: | 69 mol % n-butylacrylate, 31 mol % styrene. |

What is claimed is:

1. A process for preparing an oligomer, a cooligomer, a polymer or a copolymer (block or random) by free radical polymerization in aqueous dispersion of at least one ethylenically unsaturated monomer or oligomer, which comprises forming an aqueous dispersion having the monomer in the disperse phase and (co)polymerizing the monomer or monomers/oligomers at elevated temperature in the presence of a) at least one stable free nitroxyl radical which has a log p (octanol/water) of between −0.5 and 7.5 and which is selected from the group consisting of a compound of formula (A), (B), (C), (D), (E), (F), (G), (H) or (I)

(A) 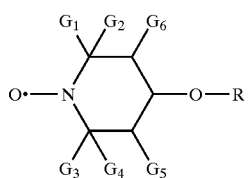

(B) 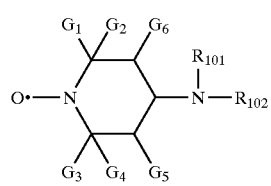

(C) 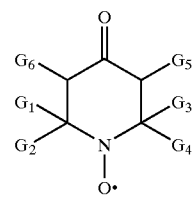

(D) 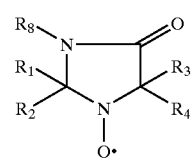

(E) 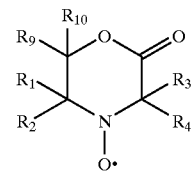

(F) 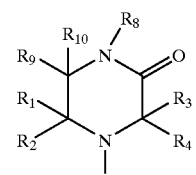

(G) 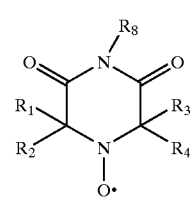

(H) 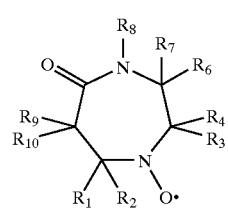

-continued

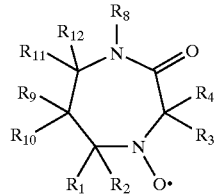

(I), wherein

R is hydrogen, $C_1$–C18alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$–$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl;

$R_1$, $R_2$, $R_3$ and $R_4$ independently of each other are $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;

$R_5$, $R_6$ and $R_7$ independently are hydrogen, $C_1$–$C_{18}$alkyl or $C_6$–$C_{10}$aryl;

$R_8$ is hydrogen, OH, $C_1$–$C_{18}$alkyl, $C_3$–$C_{18}$alkenyl, $C_3$–$C_{18}$alkinyl;

$C_1$–$C_{18}$alkyl, $C_3$–$C_{18}$alkenyl, $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl; and $R_9$, $R_{10}$, $R_{11}$ and $R_{12}$ are independently hydrogen, phenyl or $C_1$–$C_{18}$alkyl; and b) a free radical initiator;

wherein the molar ratio of free radical initiator to stable free nitroxyl radical is from 20:1 to 1:2.

2. A process according to claim 1, wherein in formula A, B and C

R is hydrogen, $C_1$–$C_{18}$alkyl, cyanoethyl, benzoyl, glycidyl, a monovalent radical of an aliphatic, carboxylic acid;

$R_{101}$ is $C_1$–$C_{12}$alkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, glycidyl, a group of the formula —$CH_2CH(OH)$—Z or of the formula —CO—Z, wherein Z is hydrogen, methyl or phenyl.

3. A process according to claim 1, wherein in formula (D), (E), (F), (G), (H) and (I) at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$–$C_6$cycloalkyl radical and one of the remaining substituents is ethyl, propyl or butyl.

4. A process according to claim 1, wherein the free radical initiator of component b) is a bis-azo compound, a peroxide or a hydroperoxide.

5. A process according to claim 1, wherein the nitroxyl radical of component a) is present in an amount of from 0.001 mol-% to 20 mol-%, based on the monomer or monomer mixture.

6. A process according to claim 1, wherein the free radical initiator is present in an amount of 0.01 mol-% to 20 mol-%, based on the monomer or monomer mixture.

7. A process according to claim 1, wherein the temperature for polymerization is from 60° C. to 180° C.

8. A process according to claim 1, wherein the pressure during the reaction is between 0.1 bar and 20 bar.

9. A process according to claim 1, wherein the ethylenically unsaturated monomer is selected from the group consisting of styrene, substituted styrene, conjugated dienes, acrolein, vinyl acetate, vinylpyrrolidone, vinylimidazole, maleic anhydride, (alkyl)acrylic acidanhydrides, (alkyl) acrylic esters, (meth)acrylonitriles, (alkyl)acrylamides.

10. A process according to claim 9, wherein the ethylenically unsaturated monomer is selected from the group consisting of styrene, acrylic acid ester, acrylamide, acrylnitrile, methacrylic acid ester, methacrylamide, methacrylnitrile.

11. A process according to claim 1, wherein the polymer formed is a block copolymer or a graft copolymer.

* * * * *